United States Patent [19]

Vinciguerra

[11] Patent Number: 5,209,270

[45] Date of Patent: May 11, 1993

[54] KEY COUPLING DEVICE FOR HIGH-SPEED ROTARY DOBBIES

[75] Inventor: Costantino Vinciguerra, Florence, Italy

[73] Assignee: Nuovopignone-Industrie Meccaniche e Fonderia S.p.A., Florence, Italy

[21] Appl. No.: 725,490

[22] Filed: Jul. 3, 1991

[30] Foreign Application Priority Data

Jul. 11, 1990 [IT] Italy .................. 20904 A/90

[51] Int. Cl.⁵ .............................................. D03C 1/00
[52] U.S. Cl. ................................................ 139/76
[58] Field of Search ................................ 139/76, 77

[56] References Cited

U.S. PATENT DOCUMENTS

| | | | |
|---|---|---|---|
| 4,452,281 | 6/1984 | Speich | 139/76 |
| 4,493,346 | 1/1985 | Speich | 139/76 |
| 4,625,767 | 12/1986 | Schwarz | 139/76 |
| 4,905,738 | 3/1990 | Kleiner | 139/76 |

FOREIGN PATENT DOCUMENTS

| | | |
|---|---|---|
| 0068139 | 1/1983 | European Pat. Off. . |
| 0082906 | 7/1983 | European Pat. Off. . |
| 0113816 | 7/1984 | European Pat. Off. . |
| 0129123 | 12/1984 | European Pat. Off. . |
| 0151655 | 8/1985 | European Pat. Off. . |
| 2036643 | 12/1971 | Fed. Rep. of Germany . |

*Primary Examiner*—Andrew M. Falik
*Attorney, Agent, or Firm*—Morgan & Finnegan

[57] ABSTRACT

A control device for rotary dobbies in which a key has a transverse groove of width equal to the thickness of a control ring with which it cooperates plus the length of travel undergone by the key in its insertion into or withdrawal from radial grooves in a big end of a main crank arm or in a drive shaft. The control ring has an elliptical shape and is fixed onto a operating lever which, pivoted on a minor axis of an ellipse and retained in its rest position by a V-shaped spring, is made to rock to one side or the other about the axis of symmetry of the spring by a pusher rod. The pusher arm is operated by a cam mechanism and moved by a needle selector controlled by a programmer, to act on one of two valleys provided in a rocking sector on an operating lever symmetrically about an axis of symmetry.

9 Claims, 6 Drawing Sheets

KEY COUPLING DEVICE FOR HIGH-SPEED ROTARY DOBBIES

The present invention relates to a simple low-cost control device for moving the keys controlling the rocking of the main crank arms of a rotary dobby. The instant control device always acts positively both in inserting the key into and withdrawing it from the grooves in the drive shaft without the use of springs and results in reliable and effective operation of the rotary dobby even at the highest air and water loom speeds at which current dobbies cannot operate and for which the complicated and costly dobbies of negative type have to be used. This device also allows interchangeability between the mechanical reading system (paper, perforated rolls, etc.) and the electronic reading system, without structural modifications.

BACKGROUND OF THE INVENTION

In rotary dobbies the main crank arm is mounted idly on the drive shaft via a cam which is interposed between the shaft and the big end of the crank arm. The cam is rigidly connected by a key to said crank arm or to said shaft and moves with intermittent motion in the form of 180° rotations followed by a pause. The key is housed in a suitable radial groove in said cam and during said drive shaft pauses is urged by mechanical movement means such that one of its ends engages one of two opposing radial grooves provided in the big end of the main crank arm or one of two opposing radial grooves in the drive shaft.

In this manner each time the key rigidly connects the cam to the drive shaft, the cam is rotated to produce a rocking of the relative main crank arm, with consequent movement of the relative loom heddle frame.

Rotary dobbies therefore operate said frames in a totally positive manner, in that they move them upwards and downwards without the use of springs.

However, for moving the keys current rotary dobbies use an internal control device of negative type in the sense that the said mechanical movement means are used only to extract the key from the grooves in the drive shaft, whereas the key is inserted into said grooves in the aid of a spring acting either directly or indirectly on the key.

This arrangement gives rise to a series of drawbacks due substantially to the presence of the spring. This means that the speed of current rotary dobbies is limited to the extent that they are unable to operate on looms with a speed exceeding about 600 beats per minute. In this respect, at very high speeds of the order of 1200 beats per minute, at which modern air or water looms are currently able to operate, the movement of the key must be able to take place within a very short time. This cannot be achieved with complete reliability using springs. Springs, in addition to inducing deleterious uncontrolled vibrations in the key, have to be able to provide a key extraction force which is at least three times that which would be theoretically necessary. This is because of the need to foresee an overdimension of the spring by a factor of two as the applied force required to move the key is not known exactly mainly on account of the key friction and vibration. Such high forces create virtually insurmountable difficulties in constructing the relative operating members for extracting the keys within the limited spaces available. These are standardized at 12 mm in an axial direction.

A further drawback is the continuous wear of the edges of the key against the corresponding edges of the radial grooves in the shaft since the key, which is kept constantly pressed by the spring against the shaft, tends to enter the relative recess in the shaft as soon as it begins to face it, and before the shaft has completely stopped. In addition, when the shaft has stopped moving, the key completes its insertion into the groove not in accordance with an optimum law of motion with braking at the end of its travel, but instead with accelerated motion which terminates with sudden stoppage when the key hits the wall at the end of its travel, with consequent impact and rebound. As a result of this inability of current rotary dobbies to operate within the high speed range of air or water looms, it has been necessary for this range to use (non-rotary) ratchet-type dobbies able only to pull the heddle frames in one direction, the frames being moved in the opposite direction by large springs.

These ratchet-type dobbies, known as "negative dobbies", are able to operate at these high speeds because the large springs are able to eliminate the entire slack of the system and the consequent vibration, but against this they are able to drive the frames through only short paths of travel, and as the path lengths increase with the number of frames used it has proved necessary to limit the number of said frames and consequently to limit the patterns which can be incorporated into the fabrics produced on such looms. In this respect, as stated the presence of the large springs necessitates frame operating forces which are three times the forces theoretically required if the springs are absent, and in order to reduce the operating forces to values which can be actually provided by the negative ratchet dobby it has been necessary to limit the length of frame travel. These dobbies also have the further drawbacks of considerable overall size to the detriment of the loom dimensions, and a high cost determined mainly by the large springs, in addition to which such dobbies are very noisy and delicate.

SUMMARY OF THE INVENTION

The object of the present invention is to obviate the aforesaid drawbacks by providing a reliable, robust and economical rotary dobby able to operate up to the maximum speeds of modern air or water looms of the order of 1200 beats per minute, without restricting the number of heddle frames or their length of travel, which can thus be the same as those of current medium-speed rotary dobbies, and hence able to replace the negative ratchet dobbies used up to the present time, so eliminating all the drawbacks of these latter.

This object is substantially attained by a totally positive control device for key movement which both inserts and extracts the key into and from the radial grooves in the drive shaft without the use of springs and in accordance with an optimum law of motion imposed preferably by a cam.

More specifically, the key is both inserted into and withdrawn from said opposing radial grooves of the main crank arm big end and, respectively, of the drive shaft during the pauses in the intermittent motion of said drive shaft, by a elliptical control ring. The control ring is fixed coaxially to the drive shaft on an operating lever the fulcrum of which lies on an axis perpendicular to that of the opposing radial grooves of said main crank arm of the dobby, said axis passing through the center of the dobby drive shaft and containing the minor axis of said elliptical ring, and is inserted into a groove provided in the body of the key perpendicular to its axis and of width equal to the sum of the thickness of the elliptical control ring and the length of the travel stroke undergone by the key in its insertion into or withdrawal from said radial grooves. Said operating lever, which during the pauses in the intermittent motion of the drive shaft is made to rock by an operating system, preferably of cam type, either in one direction or in the other direction in accordance with a predetermined program, in order to insert or withdraw said key into or from, or leave it inserted into or withdrawn from, said opposing radial grooves, is always immediately returned to its central rest position at the end of said pause by a preferably vertical V-shaped spring, the extend of diverging of the arms of which is limited by shoulders fixed symmetrically about the axis of symmetry of said spring, which passes through the fulcrum of said operating lever, whereas the ends of said arms are inserted into an overlying cavity provided in the body of said operating lever. Said operating system preferably of cam type for rocking said operating lever comprises of a sector rocking symmetrically about said axis of symmetry of the V-shaped spring and hinged at the bottom to a slide slidable along a corresponding cavity in said operating lever, said sector upperly comprising two valleys positioned symmetrically about said axis of symmetry of the V-shaped spring to cooperate with the lower end of an overlying pusher rod which, hinged by its upper end to an arm projecting from a shaft made to rock by a well known control mechanism preferably of cam type synchronized with the loom, is moved at each revolution of the loom into one of two positions corresponding with the underlying said two valleys in the rocking sector by a needle selector, between two pins of which there slidingly passes said pusher rod, said selector cooperating with the port of a programmer by the action of a spring and an extractor comb, which is also made to rock by a control mechanism of cam type synchronized with the loom.

In the present device the cooperation between the pusher rod and one or other of the two valleys in the rocking sector causes clockwise or anti-clockwise rotation of the sector which in its turn produces consequent rotations of the operating lever and hence a movement of its elliptical ring, which by interacting with the edges of the groove in said key induces the required always positive movements of entry, exit or retention of said key into, from or in said radial grooves of the main crank arm big end or, respectively, of the drive shaft. As the movements are always rigidly controlled by cams synchronized with the modulator generating the pauses of the drive shaft, they can now be made to occur at the most suitable moment, is precisely when the drive shaft has just stopped for its pause, and in accordance with an effective and precise law of motion.

The operation of the present invention is optimized by the combination of the continuous and immediate return of said operating lever into its central rest position at the end of each pause in the movement of the drive shaft, with consequent perfect centering of its elliptical ring about said drive shaft, of the particular size of the groove in said key which gives said ring a clearance exactly equal to the stroke of travel which the key must undergo, and of the particular elliptical shape of said elliptical ring.

In this respect, said central return of the elliptical ring with respect to the drive shaft at the beginning of each pause means that the elliptical ring is always brought into contact with the wall of the groove in the key opposite that previously operated, so that the key can be immediately moved without any idle time and hence at high speed to change its position, whereas if the key is required to remain in the same position said clearance in the key groove enables the elliptical ring to undergo an inactive stroke. Again, the elliptical shape of the control ring, with its minor axis perpendicular to the axis of the main crank arm, means that the key, during its rotation rigid with the drive shaft and hence while describing circular trajectories concentric with the axis of said shaft, is unable to drag by friction the operating lever with the ring tangential to the drive shaft in the two critical regions of the ring defined by the axis passing through the center of the drive shaft and through the fulcrum of the operating lever, with consequent dragging of the ring. In this respect, said elliptical shape of the ring means that there is no longer contact between the ring and key in said critical regions, as the minor axis of the ellipticity of the ring is defined such that the ring is approximately equidistant between the two walls of the groove in the key. This is substantially achieved by making the minor axis of said elliptical control ring equal to the major axis less the stroke of travel undergone by the key in its insertion into or withdrawal from said opposing radial grooves in the big end of said main crank arm or in said drive shaft. In addition, such an arrangement, operating with a single needle selector, enables programmers of different types to be used, such as mechanical programmers using paper or perforated rolls, or electromagnetic programmers which can be combined with electronic memories.

In the present invention during reverse running the movement of said slide induced by said rocking sector is now absorbed by one of the two ends of the W-shaped spring which is thus further loaded, and as the rotation of the drive shaft proceeds the key finally becomes aligned with the corresponding groove, said end of the spring then releasing its load to insert the key into the groove.

In addition, the high preloading of the spring means that during normal operation of the drive shaft said W-shaped spring acts as a rigid cavity.

The arrangement of the radial grooves in the present invention not only ensures high precision in the exact positioning of said grooves by said centering pins and the necessary coplanarity with the plane of the main crank arm as a result of the fixing of the half rings on their center line, but also results in an increasing rigidity of the groove at the half-ring fixing point, ensuring a forced and reliable completion of the insertion of the key into the grooves in the drive shaft.

The embodiment having a split rocker sector has the advantage of further reducing the idle times because of the extreme closeness of the two valleys with which said pusher rod is required to cooperate, thus enabling the operating speed of the rotary dobby to be further increased.

The invention is further clarified hereinafter with reference to the accompanying drawings, which show preferred embodiments thereof by way of non-limiting example in that technical and constructional modifications can be made thereto but without leaving the scope of the present invention.

DETAILED DESCRIPTION OF THE DRAWINGS AND PREFERRED EMBODIMENTS

In the FIGURES, the reference numeral 1 indicates a main crank arm of the rotary dobby, the small end 1' of which is hinged to the main lever 2 which, via a series of linkages, drives the relative heddle frame 3 of the loom. The big end 1" of said main crank arm 1 is mounted idly, via a cam 4, on a drive shaft 5 rotated with pauses at every 180° by a modulation mechanism of known type and therefore not shown in the FIGURE. Said cam 4 alternatively connected rigidly to said crank arm 1 or to said shaft 5 by a key 6 which is housed in a suitable radial groove 7 in said cam 4, one of its ends being inserted or maintained inserted, during said pauses of the drive shaft 5, into or in one of two opposing radial grooves 8 or 9 provided in said big end 1" of the main crank arm 1, or one of two opposing radial grooves 10 or 11 in said drive shaft 5, in accordance with the instructions of a programmer 12, by the action of a control ring 13 which is positioned coaxial to said shaft 5 to cooperate with the walls 14 or 15 of a transverse groove 16 in the key.

Said control ring 13 is of elliptical shape (see specifically FIG. 2) with the minor axis 17 of the ellipse equal to the major axis 18 less the length of the travel stroke 19 undergone by the key 6 during its insertion into or withdrawal from said radial grooves 8, 9, 10 or 11, and is fixed onto an operating lever 20, the fulcrum 21 of which lies on the prolongation of the minor axis 17 of the elliptical control ring 13, the major axis 18 of which thus lies along an axis 22 joining said opposing radial grooves 8 and 9 in said big end 1" of the main crank arm 1. Said transverse groove 16 in said key 6 has a width equal to the sum of the thickness of said control ring 13 and the length of said travel stroke 19 of the key, which is also provided with a leaf spring 23 which presses it perpendicularly against the sliding surface of the radial groove 7 of said cam 4, said spring 23 being supported for this purpose by a pin 24 rigid with said cam 4 and passing through a slot 25 (see specifically FIGS. 2 and 3) provided in the key 6. Said opposing radial grooves 8 and 9 in said big end 1" of the main crank arm 1 are formed at the two opposing adjacent ends, 16', 26" and 27', 27" respectively, of two specular elastic half-rings 26 and 27 which are fixed on their center line to said big end 1" of the main crank arm 1 by fixing pins 28 ad are preloaded against two centering pins 29 overlying the two sad radial grooves 8 and 9 and also fixed to said big end 1" of the main crank arm 1.

Figure 1:
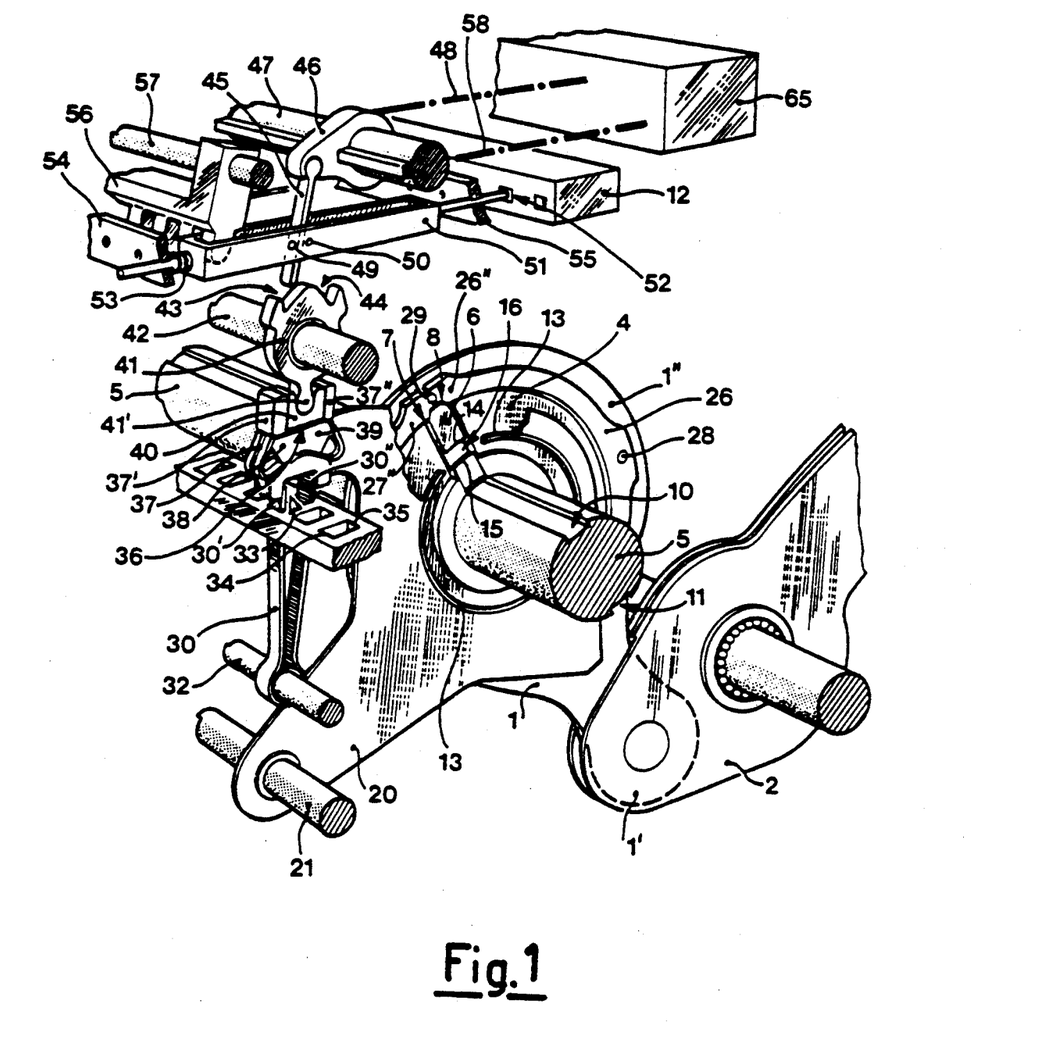
FIG. 1 is a part sectional partial perspective view of the rotary dobby control device constructed in accordance with the invention.
Figure 4:
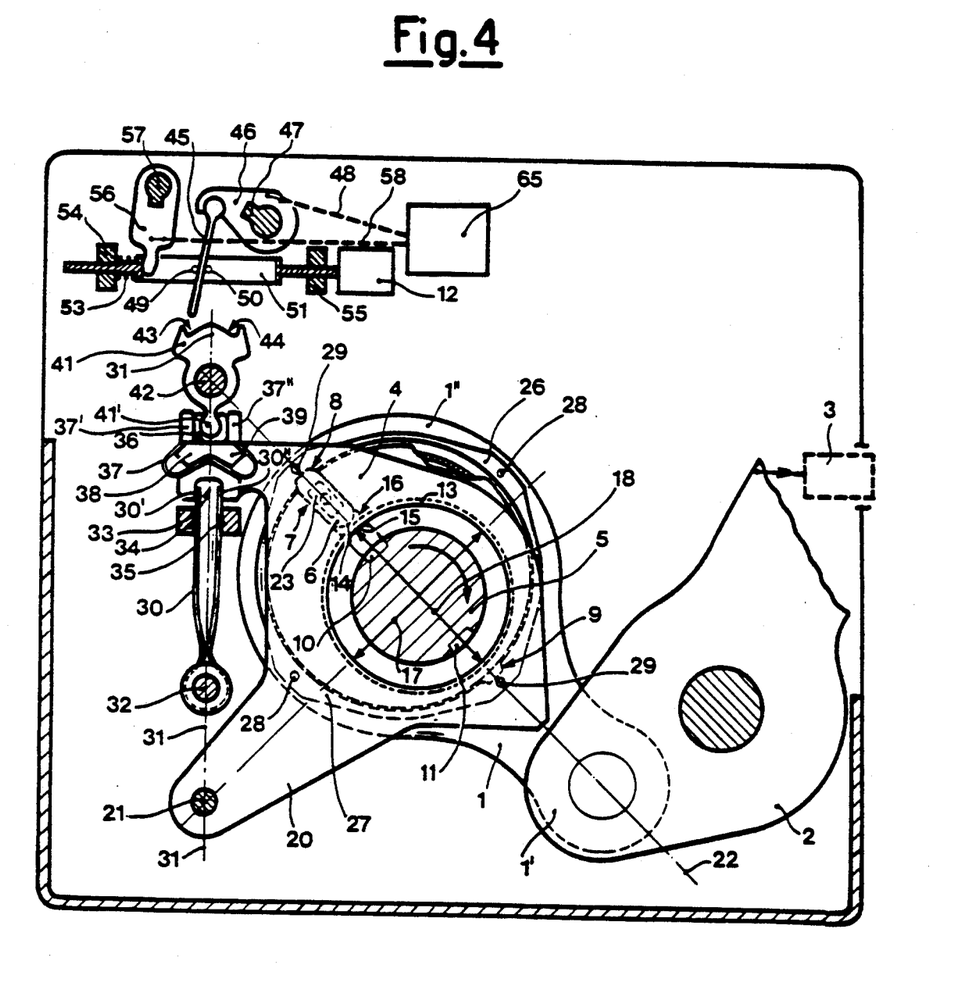
FIG. 4 is a front sectional view of the control device of FIG. 1 with the key inserted into the radial groove in the big end of the main crank arm.

Said operating lever 20 also cooperates with a V-shaped spring 30, the axis of symmetry 31 of which (see FIG. 4) passes through the spring support axis 32 and through said fulcrum 21 of said operating lever 20, said spring 30 having the ends 30' and 30" of its two branches inserted into a cavity 33 facing said fulcrum 21 and provided in the body of the lever 20, and being mounted preloaded between two fixed shoulders 34 and 35 arranged symmetrically about said axis of symmetry 31. The operating lever 20 also comprises a second cavity 36 opposing the preceding and defined by the opposing ends 37' and 37' of a W-shaped spring 37 mounted preloaded under high load by means of two internal ledges 38 and 39 fixed onto said operating lever 20. Said second cavity 36 cooperates with a slide 40 to which there is hinged the lower end 41' of a sector 41 which rocks about the axis 42 symmetrically with respect to said axis of symmetry 31 of the V-shaped spring 30, and which in its upper part comprises two valleys 43 and 44 also arranged symmetrically about sad axis of symmetry of the V-shaped spring 30, to cooperate with the lower end of an overlying pusher rod 45 hinged at its upper end to an arm 46 projecting from a shaft 47 which is made to rock, via the connection 48, by a drive mechanism 65 preferably of cam type synchronized with said modulation mechanism. Said pusher rod 45 is slidingly inserted between two guide pins 49 and 50 of a needle selector 51 which cooperates with the port 52 (see FIG. 1) of said programmer 12 by the action of the thrust spring 53 acting between said selector and one of two holed bars, 54 and 55, respectively, for guiding and supporting the selector, and the action of a return extractor comb 56 made to rock about the axis 57 of said drive mechanism 65 by the connection 58.

It is apparent that said programmer 12 which via its ports 52 cooperates with the needle selectors 51 of the rotary dobby can be a mechanical programmer of paper or perforated roll type or an electromagnetic programmer of electronic memory type.

Figure 5:
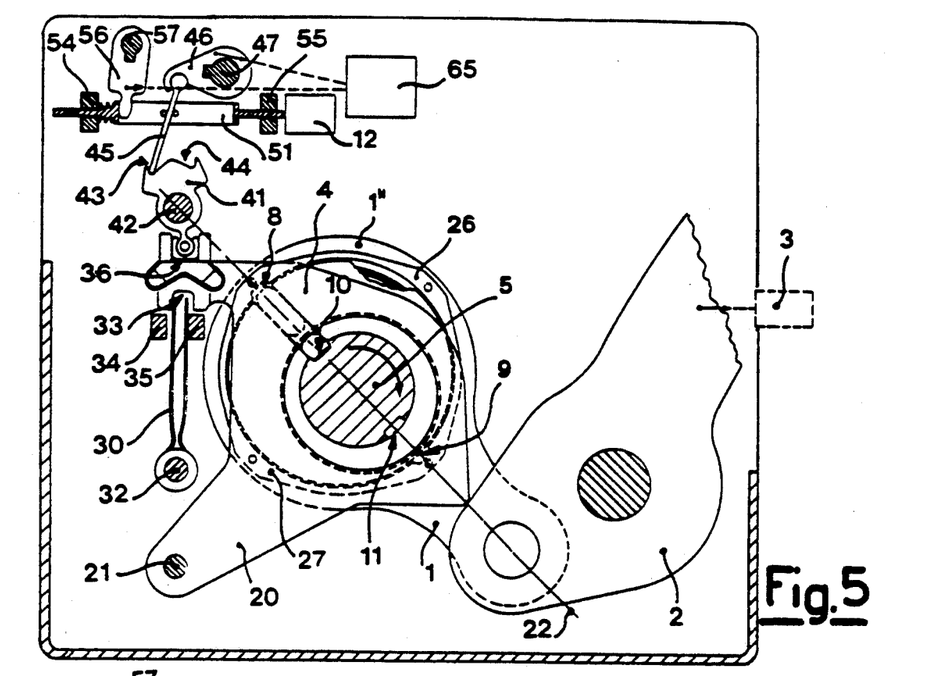
FIGS. 5 to 9 are front views showing various stages in the operation of the control device of FIG. 1.
Figure 10:
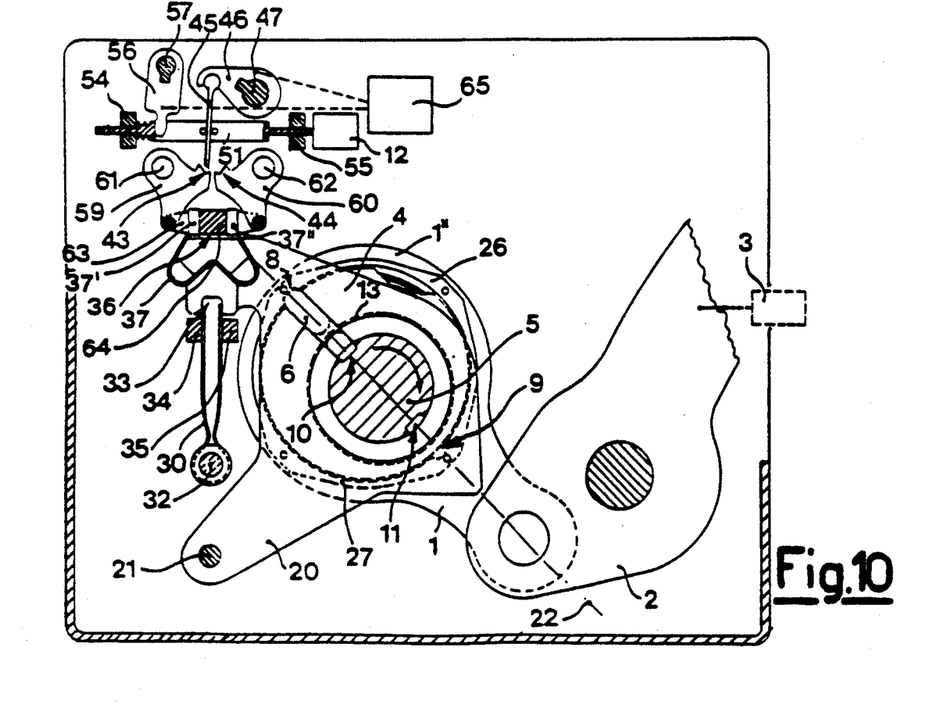
FIG. 10 is a front view of a modification according to the invention of the control device of FIG. 1.

According to a modification of the invention shown in FIG. 10, said rocking sector is in the form of two bell crank levers 59 and 60 comprising in their upper part the said two valleys 43 and 44 in a mutually adjacent arrangement specular about said axis of symmetry 31 of the V-shaped spring 30, said levers 59 and 60 being hinged on the axes of rotation 61 and 62 specular about said axis 31, and being connected together at their bottom by a connection link 63 comprising in its central region a slide block 64 cooperating with said second cavity 36 of said operating lever 20. The method of operation of such a device is as follows. Starting from the state shown in FIG. 4 in which the key 6 is inserted into the radial groove 8 in the big end 1" of the main crank arm 1, which therefore remains immobile together with its cam 4, as it is idly mounted on the clockwise-rotating drive shaft 5, it will be assumed that the programmer 12 now gives the closing instruction to the port 52 which cooperates with the needle of the selector 51. IN this case the needle selector 51 remains in the position of FIG. 4 and the next command by the mechanism 65 moves the pusher rod 45 into cooperation with the valley 43 of the rocking sector 41 to cause it to rotate anticlockwise, with a consequent clockwise rotation of the operating lever 20, the elliptical ring 13 of which, by pressing against the wall 15 of the transverse groove 167 in the key 6, causes this latter to move radially from said groove 8 to the groove 10 of the drive shaft 5 (see FIG. 5). All this happens during the pause in the rotational movement of the drive shaft 5 imposed by the modulation mechanism, which is synchronized with the cam-type drive mechanism 65. Thus, when the drive shaft 5 begins to rotate again, the pusher rod 45 is raised into its initial position by the mechanism 65, allowing the V-shaped spring 30, the branch 30" of which was moved by said clockwise rotation of the operating lever 20 (see FIG. 4), to return said lever 20 into its initial position with the elliptical ring 13 centered about the drive shaft 5, and at the same time the cam 4, now made rigid with the drive shaft 5 by said key 6, begins to rotate so moving the main crank arm 1, the main lever 2 and the heddle frame 3 connected to it.

Figure 6:
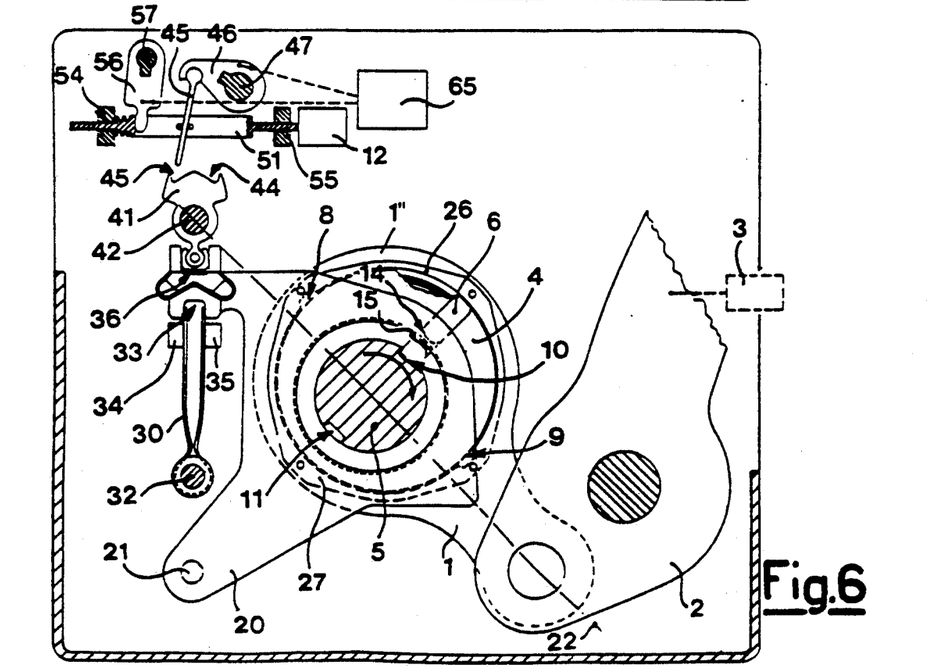

After a 90° rotation of the shaft 5 and cam 4, the key 6 is in the position shown in FIG. 6 in which the determining effect of the elliptical shape of the control ring 13 can be seen, this being equidistant from the walls 14 and 15 of the transverse groove 16 of the key 6, hence eliminating the sliding contact which would occur between the wall 14 and 15 of the transverse groove 16 of the key 6, hence eliminating the sliding contact which would occur between the wall 14 of the key and the ring 13 brought into contact with said wall by its return to a centered position about the shaft 5 by s id action of the V-shaped spring 30, if the ring 13 had been circular.

Figure 7:
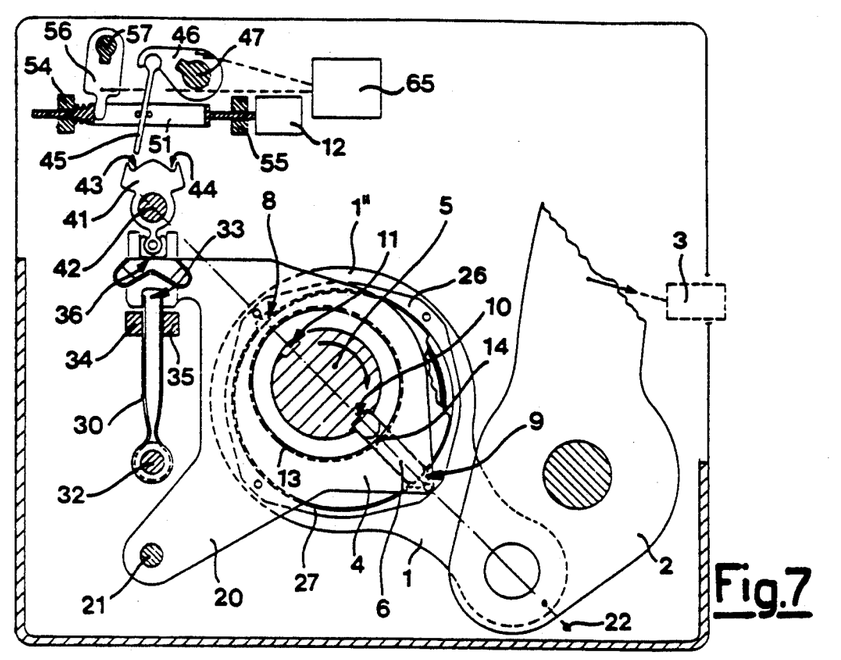

After a 180° rotation of the shaft 5 the next pause in the rotation of said shaft is reached, with the main crank arm 1 positioned at one of the two dead centers of its travel stroke and the ring 13 in contact with the wall 14 of the transverse groove 16 of the key 6, as shown in FIG. 7. Two situations can occur at this point, ie either the programmer 12 reconfirms the closing instruction to the port 52 or gives the opening command to said port 52.

Figure 8:
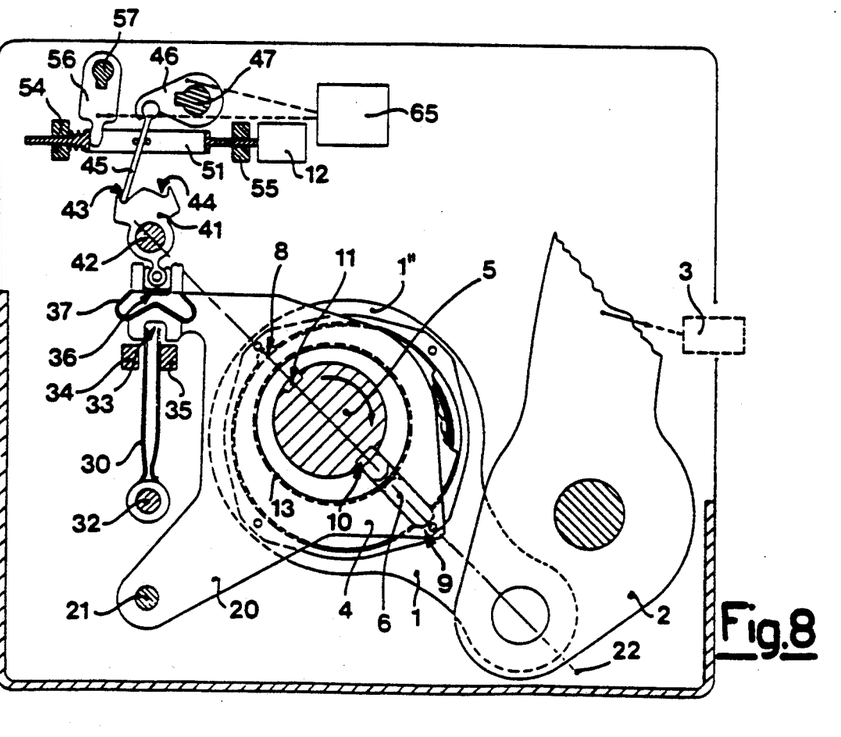

In the first case the needle selector 51 remains in the illustrated position and the next command by the mechanism 65 returns the pusher rod 45 into cooperation with the valley 43 of the rocking sector 41. This causes a new anticlockwise rotation of the sector 41 with a consequent clockwise rotation of the sector 41 with a consequent clockwise rotation of the operating lever 20, the elliptical ring 13 of which, by pressing against the wall 14 of the traverse groove 16 of the key 6, radially moves this latter from the groove 10 of the drive shaft 5 to the radial groove 9 in the big end 1" of the main crank arm 1 (see FIG. 8). Thus when the drive shaft 5 again rotates, the cam 4 remains at rest together with the crank arm 1, to which it is locked by the key 6.

Figure 2:
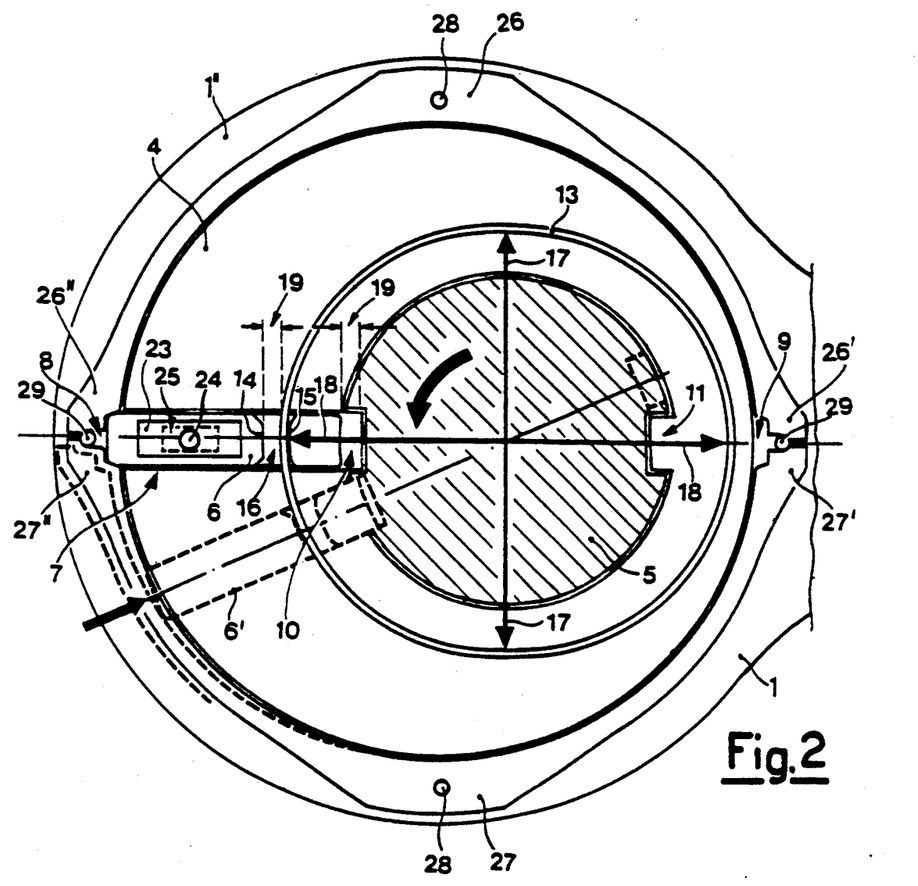
FIG. 2 is a plan view to a greatly increased scale of a detail of the control device of FIG. 1.
Figure 3:
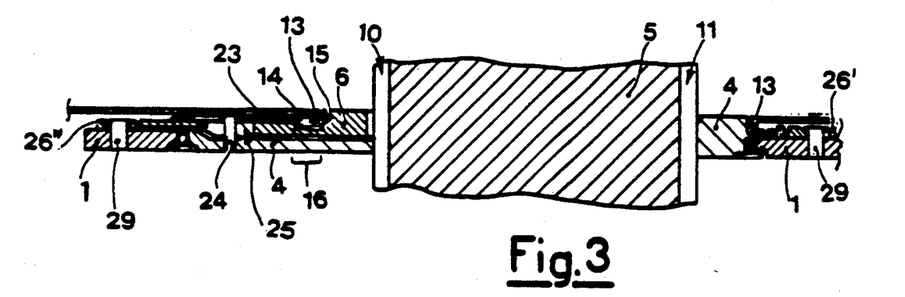
FIG. 3 is a section through a detail of FIG. 2.
Figure 9:
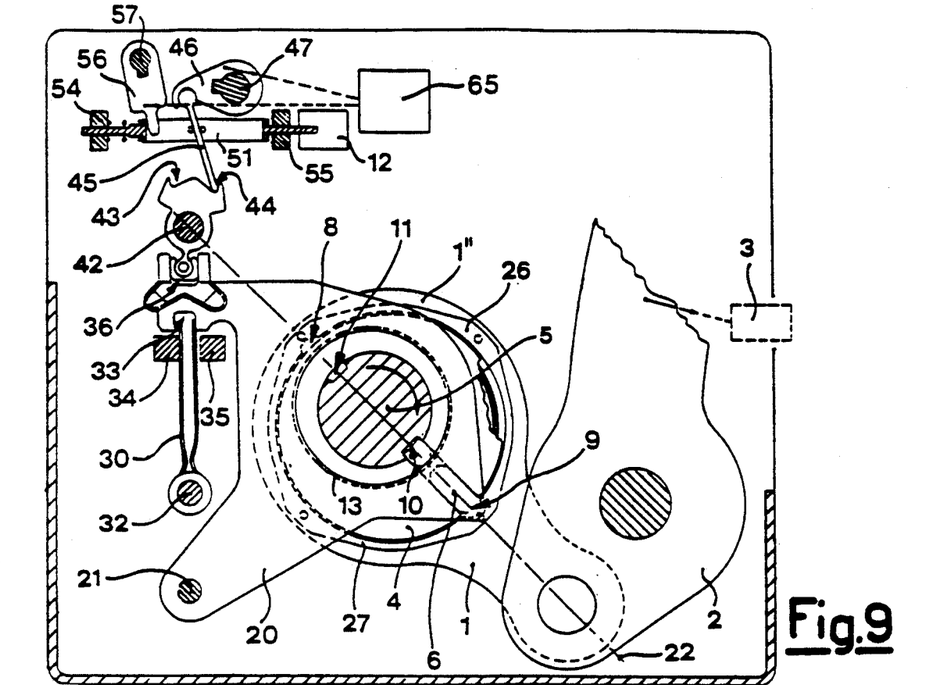

In the second case, in which the programmer 12 opens the port 52, the needle of the selector 51 penetrates into said port 52 so that the selector moves the pusher rod 45 into the valley 44 of the rocking sector 41 (see FIG. 9) with the result that the next command of the mechanism 65 causes a clockwise rotation of said sector 41 and a consequent anticlockwise rotation of the operating lever 20, and hence a movement of its elliptical ring 13 from its contact with the wall 14 of the transverse groove 16 of the key 6 (see FIG. 7) to its contact with the wall 15 of said groove (see FIG. 9), because of the particular said dimensioning of the groove 16 this movement not having any effect on the key 6, which remains inserted in the groove 10 of the drive shaft 5. Finally, FIG. 2 shows how the fact of forming the radial grooves 8 and 9 on the big end 1" of the crank arm 1 by means of the two elastic half-rings 26 and 27 with increasing rigidity towards their central fixing point 28 prevents damage due to wrong partial insertion of the key into the radial grooves during reverse running with the drive shaft rotating anticlockwise, as the possible elastic deformation of said half-rings (see FIG. 2 in which the half-ring 27' shown by dash lines is deformed by the key 6' also shown in dash lines) creates an increasing radial force F on the end of the key, which induces automatic and complete insertion of the key into the radial grooves of the drive shaft 5.

Claim:

1. A control device for a high-speed rotary dobby comprising a main crank arm which has a small end hinged to a main lever of the dobby and a big end mounted idly on a drive shaft driven with intermittent motion with pauses at every 180° of rotation by a modulation mechanism via a cam which is rigidly connected alternately to said crank arm or to said shaft by a key which is housed in a radial groove in said cam and an end of said key during said pauses in the drive shaft is inserted into or is maintained inserted in one of two opposing radial grooves in said big end of the main crank arm or one of two opposing radial grooves in said drive shaft, in accordance with instructions of a programmer, by a control ring coaxial to said shaft, said ring cooperating with walls of a transverse groove in the key, wherein said transverse groove in the key has a width equal to the sum of the thickness of said control ring and length of travel undergone by the key in its insertion into or withdrawal from said radial grooves, said control ring being of elliptical shape with its major axis positioned along an axis of said opposing radial grooves in said big end of the main crank arm and fixed onto an operating lever the fulcrum of which lies on a prolongation of the minor axis of said elliptical control ring, said operating lever cooperating with a V-shaped spring which has ends of its two arms inserted in a cavity facing the lever fulcrum and provided in the body of the lever, and which is mounted preloaded between two fixed shoulders positioned symmetrically about an axis of symmetry of said spring, which passes through said fulcrum of said operating lever, this latter comprising a second cavity opposite the preceding cavity and cooperating with a slide to which there is hinged a lower end of a sector which rocks symmetrically about said axis of symmetry of the V-shaped spring, said sector comprising in its upper part two valleys arranged symmetrically about said axis of symmetry of the V-shaped spring and cooperating with a lower end of an overlying pusher rod which is hinged at its upper end to an arm projecting from a shaft made to rock by a control mechanism synchronized with said modulation mechanism, said overlying pusher rod is slidingly inserted between two pins of a needle selector which cooperates with a port of the programmer by the action of a thrust spring and a return extractor comb made to rock by a second control mechanism and also synchronized with said modulation device.

2. A control device for a high-speed rotary dobby as claimed in claim 1, wherein said second cavity present in said operating lever for guiding said slide is formed by opposing ends of a W-shaped spring mounted preloaded with high load by means of two opposing internal ledges fixed on said operating lever.

3. A control device for a high-speed rotary dobby as claimed in claim 1, wherein said opposing radial grooves in said big end of the main crank arm are formed at two opposing adjacent ends of two specular elastic half-rings fixed on their center line to said big end of the main crank arm and preloaded against two centering pins overlying the two said radial grooves and fixed to said big end of the main crank arm.

4. A control device for a high-speed rotary dobby as claimed in claim 1, wherein said key is provided with a leaf spring which is supported by a pin rigid with said cam and passing through a slot provided in the key, and presses against this later in a perpendicular direction.

5. A control device for a high-speed rotary dobby as claimed in claim 1, wherein said rocking sector is formed from two bell crank rocker lever hinged together in an opposing arrangement specular about said axis of symmetry of the V-shaped spring, said bell crank rocker levers comprising an upper part two valleys in a mutually adjacent arrangement, specular about said axis of symmetry of the V-shaped spring, and said bell crank levers being hinged at a bottom to a connection link comprising a slide block cooperating with said second cavity of said operating lever.

6. A control device for a high rotary dobby as claimed in claim 1, wherein said programmer cooperating with said needle selector is a mechanical programmer of paper or perforated roll type.

7. A control device for a high-speed rotary dobby as claimed in claim 1, wherein said programmer cooperating with said needle selector is an electromagnetic programmer of electronic memory type.

8. A control device for a high-speed rotary dobby as claimed in claim 1, wherein said elliptical control ring is formed with a minor axis of its ellipse equal to the major axis of the ellipse less the length of the travel stroke undergone by the key in its insertion into or withdrawal from said opposing radial grooves in the big end of said main crank arm or in said drive shaft.

9. A control device for a high-speed rotary dobby as claimed in claim 1, wherein said first and second control mechanisms are of a cam type.

* * * * *